July 1, 1930. L. DE VITO 1,768,749
MACHINE FOR MAKING FLAT NOODLES
Filed Jan. 9, 1928
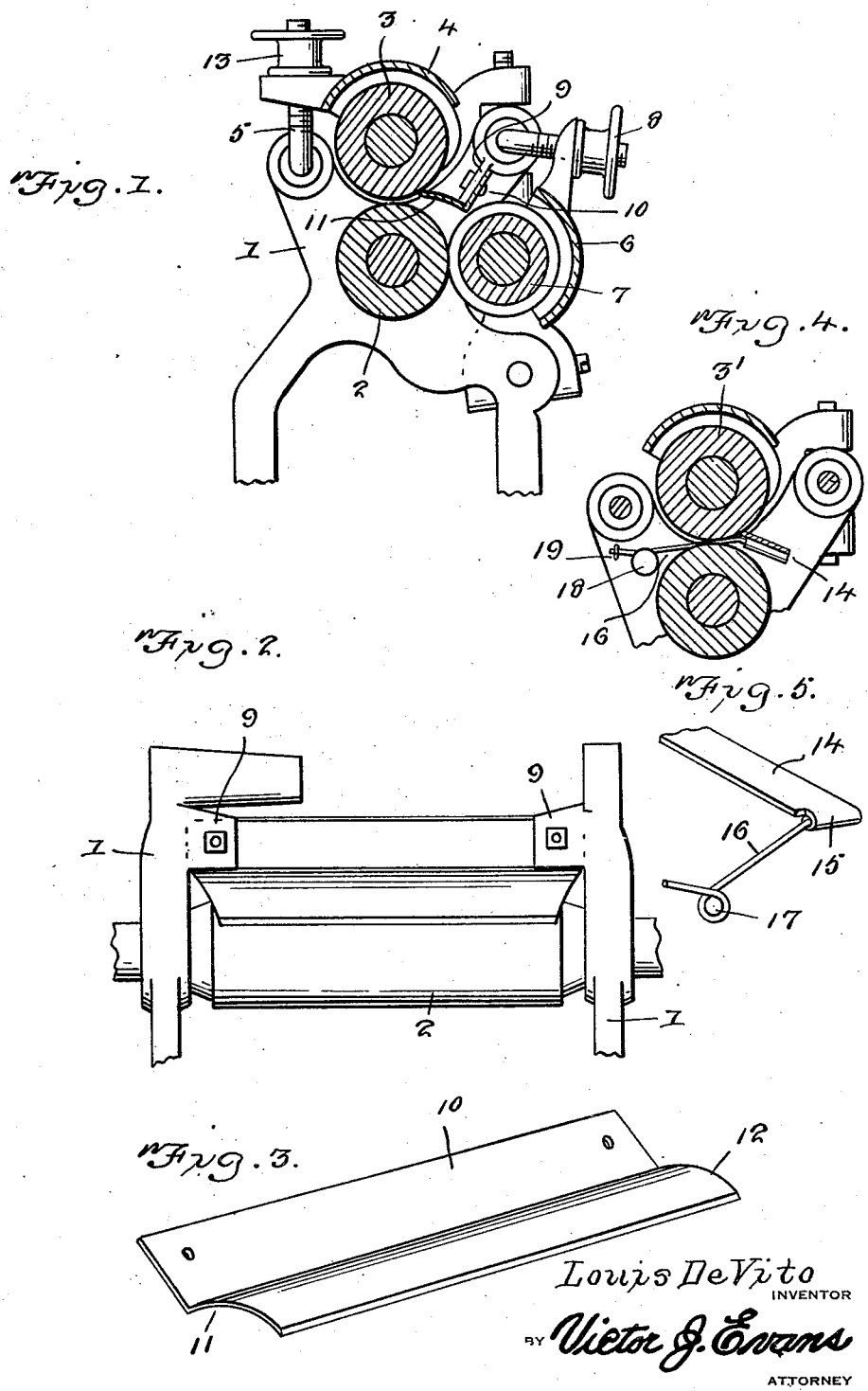
Louis DeVito
INVENTOR
BY Victor J. Evans
ATTORNEY Patented July 1, 1930

1,768,749

UNITED STATES PATENT OFFICE

LOUIS DE VITO, OF CLEVELAND, OHIO

MACHINE FOR MAKING FLAT NOODLES

Application filed January 9, 1928. Serial No. 245,465.

My present invention has reference to a machine for making flat or ribbon-like noodles of the type and of the particular and peculiar characteristics set forth in my co-pending application executed by me on Dec. 22, 1927, filed January 9, 1928, and bearing Serial No. 245,464, which became Patent No. 1,738,361.

The object of my present invention is the provision of a scraper to engage with the upper or presser roll of the machine that shall be of spring construction or spring urged to not only effectively scrape the roll and guide the dough therefrom, but to urge the presser roll away from the feed roll to which it is opposed.

To the attainment of the foregoing the invention consists in the improvement hereinafter described and definitely claimed.

In the drawings, which form part of this application:

Figure 1 is a transverse sectional view through the upper portion of the machine and illustrating the application of my improvement thereon.

Figure 2 is a top plan view of the machine with parts removed to better illustrate the arrangement of the improvement thereon.

Figure 3 is a perspective view of the improvement per se.

Figure 4 is a fragmentary sectional view through the machine to illustrate a modification of the improvement, the latter being also in section.

Figure 5 is a fragmentary perspective view of the form of the improvement illustrated by Figure 4.

As set forth in my co-pending application, Serial No. 245,464, the machine for making flat noodles includes a frame through whose ends 1 there is journaled the trunnions of a feed roll 2. Above the feed roll there is a presser roll 3 whose trunnions are journaled in the ends of a hood or cover 4 that is pivoted to the frame in a manner to permit of lateral and longitudinal adjustment to properly aline the roll 3 with respect to the roll 2. Also the hood or cover 4 is engaged by adjustable latching means, broadly indicated by the numeral 5, whereby the hood and the roll 3 may be swung toward the roll 2 or permitted to move away from said feed roll 2. There is also journaled in a swingable hood 6 on the frame a rolling cutter 7, and means 8 is provided for regulating the adjustment of the rolling cutter 7 with respect to the feed roll 2; together with a comb-like scraper for the rolling cutter and means for simultaneously revolving the rolls 2 and 3 and the rolling cutter 7.

The sides of the frame 1, above the rolling cutter 7 are formed with inwardly directed angularly arranged lugs 9, (Figures 2 and 3). To these lugs there is bolted the flat body plate 10 of the spring scraper and dough director 11. In the showing of Figures 1, 2 and 3 the body 10 of the spring scraper is formed at one of its edges with an arched extension 12 that provides the scraper proper. Obviously the end 12 of the spring scraper may be arranged at an angle to the body thereof and need not be curved in cross section. As disclosed by Figure 1 of the drawings the outer edge of the part 12 of the spring scraper contacts with the lower perimeter of the presser roll 3, and not only serves as an effective scraper for this roll and a guide for the dough directed between the rolls 2 and 3, but at all times urges the roll 3 away from the roll 2, so that by simply adjusting the nut 13 of the clamping means 5, in an unscrewing direction, the roll 3 and the hood 4 carrying this roll will be urged away from the roll 2. By this arrangement the flat sheets of dough fed between the rolls 2 and 3, (when the hood 6 and the rolling cutter 7 are swung outwardly on the frame) may be compressed between the said rolls 2 and 3 to desired thicknesses. Of course, when the dough is to be cut into strips the hood and the rolling cutter carried thereby is swung against and latched to the frame.

In Figures 4 and 5 I have illustrated a slight modification. In these figures the scraper is in the nature of a flat plate 14, one edge of which contacts with the lower perimeter of the presser roll 3'. The plate, has the corners thereof rounded to provide eyes 15 for the reception of the straight ends of spring wires 16. These wires are coiled upon themselves, as at 17 and the said coils receive therethrough studs or screws 18 which enter the sides of the frame. The outer ends of the spring wires 16 are fixed by means 19 to the end members of the frame. This form of scraper functions in the same manner as the one previously described.

Having described the invention, I claim:

In a dough rolling and cutting machine, the combination with a frame including sides, and a feed roll and presser roll, mounted between said sides of a scraper for coaction with the feed roll comprising a scraper blade having one longitudinal edge in engagement with the periphery of the feed roll near the bottom and at one side thereof, the ends of the blade being overturned, inwardly of said edge, to provide sleeve portions upon the under side of the blade, and a resilient support for each end of the blade comprising a resilient wire frictionally fitted at one end in the sleeve portion at the respective end of the blade, the wire being coiled to provide an eye intermediate its ends, a stud upon the respective side of the frame upon which the eye is rotatably fitted, and means securing the other end of the wires to the said respective side of the frame, the scraping edge of the blade being presented in the general direction of the last mentioned ends of the wire.

In testimony whereof I affix my signature.

LOUIS DE VITO.